United States Patent [19]
Timm et al.

[11] Patent Number: 5,687,215
[45] Date of Patent: *Nov. 11, 1997

[54] VEHICULAR EMERGENCY MESSAGE SYSTEM

[75] Inventors: Mark James Timm, Northville; Walter Alfred Dorfstatter, Farmington, both of Mich.

[73] Assignee: Ford Motor Company, Dearborn, Mich.

[*] Notice: The portion of the term of this patent subsequent to Apr. 10, 2015, has been disclaimed.

[21] Appl. No.: 419,350

[22] Filed: Apr. 10, 1995

[51] Int. Cl.$^6$ .................. H04M 11/04; H04M 11/00; H04B 17/00
[52] U.S. Cl. .................. 379/58; 379/37; 379/45; 379/59; 455/67.7
[58] Field of Search .................. 379/58, 59, 37, 379/45; 364/499; 455/67.7

[56] References Cited

U.S. PATENT DOCUMENTS

| | | |
|---|---|---|
| 3,765,016 | 10/1973 | Bert et al. . |
| 4,897,642 | 1/1990 | DiLullo et al. . |
| 5,043,736 | 8/1991 | Darnell et al. . |
| 5,081,667 | 1/1992 | Drori et al. . |
| 5,119,504 | 6/1992 | Durboraw, III . |
| 5,365,570 | 11/1994 | Boubelik ............... 379/59 |
| 5,463,671 | 10/1995 | Marsh et al. .......... 379/58 |
| 5,479,482 | 12/1995 | Grimes ................. 379/59 |
| 5,504,491 | 4/1996 | Chapman ............ 364/449 |
| 5,535,260 | 7/1996 | Zicker et al. ........ 379/59 |
| 5,548,632 | 8/1996 | Walsh ................... 379/58 |
| 5,572,204 | 11/1996 | Timm et al. ......... 379/59 |

FOREIGN PATENT DOCUMENTS

| | | |
|---|---|---|
| 0123562 | 10/1984 | European Pat. Off. . |
| 0242099 | 10/1987 | European Pat. Off. . |
| WO 89/12835 | 12/1989 | European Pat. Off. . |
| 2541801 | 2/1983 | France . |

OTHER PUBLICATIONS

Cellular Positioning and Emergency Messaging Unit Publication, Motorola, 1994.

*Primary Examiner*—Curtis Kuntz
*Assistant Examiner*—Binh K. Tieu
*Attorney, Agent, or Firm*—Mark Mollon

[57] ABSTRACT

A vehicle user can request emergency or roadside assistance from a response center by activating a button in the vehicle. The global positioning system is used to continuously store the vehicle location. A cellular telephone network is used to contact a response center and transfer a data string via modem containing information to assist the response center in acting on the request. The response center sends a termination tone to the vehicle upon satisfactory completion of the request. If the vehicle loses contact with the response center prior to receiving the termination tone, it attempts to reestablish communication with the response center.

4 Claims, 5 Drawing Sheets

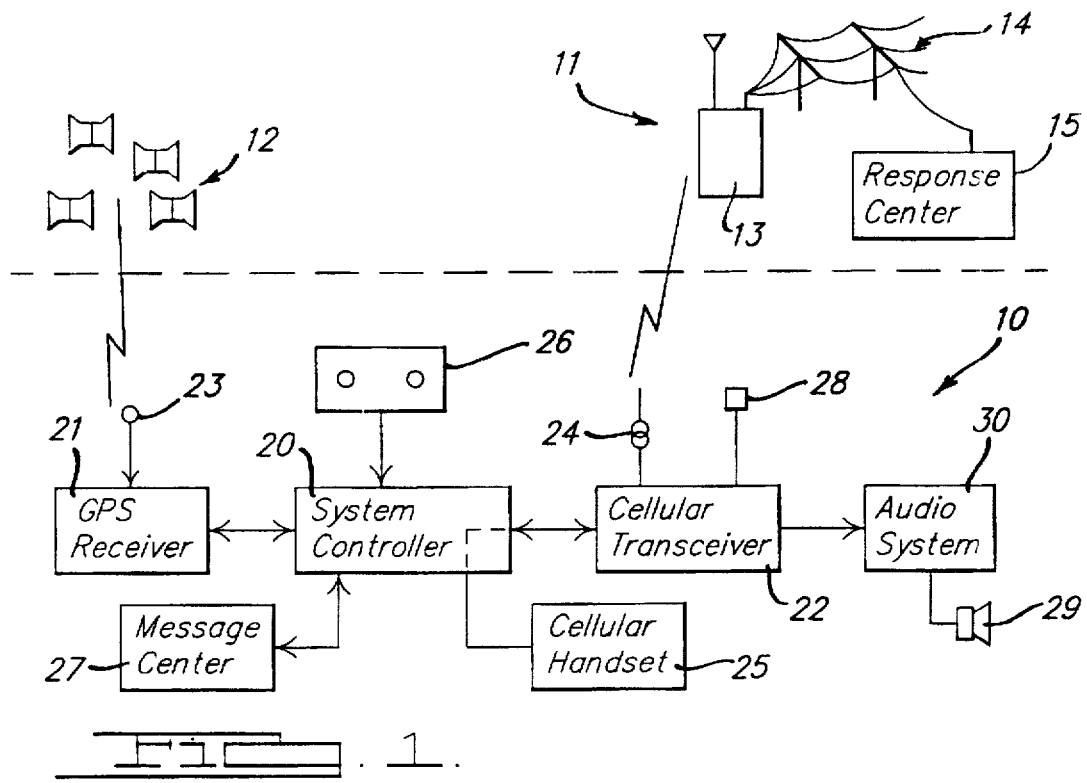
FIG. 1.
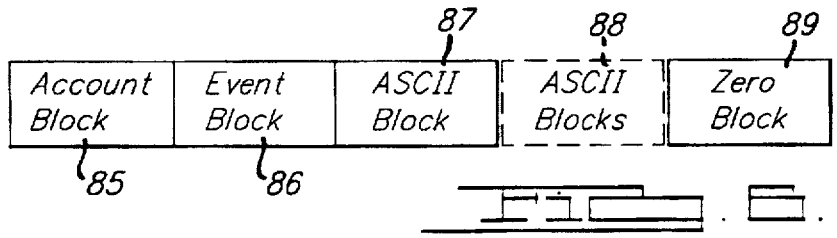
FIG. 6.
| | RCE | AR | BLen | Func Code | Data (CID) | CPar |
|---|---|---|---|---|---|---|
| Bin | 0 | 1 | 001010 | 00100011 | | * |
| Hex | | | 4A | 23 | 31 32 38 37 36 35 34 33 32 31 | * |
| ASCII | | | J | # | 1 2 8 7 6 5 4 3 2 1 | * |
FIG. 7.
| RCE | AR | BLen | Func Code | Data (Day, Time Of Day, Event Code) | CPar |
|---|---|---|---|---|---|
| 0 | 0 | 010110 | 01001110 | | * |
| | | 16 | 4E | | * |
| | | | N | da06-01-95ti14:23:34QS | * |
FIG. 8.

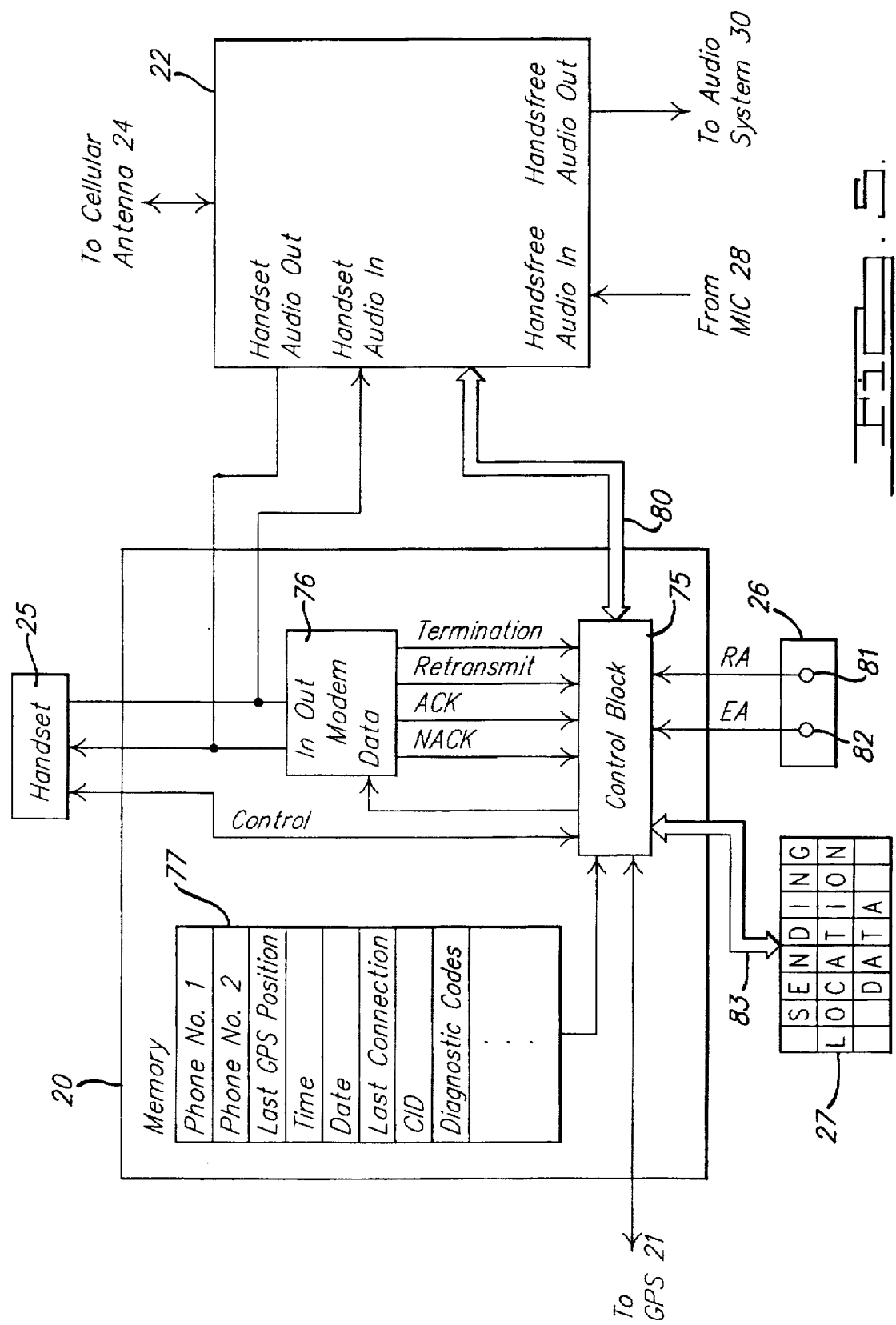

VEHICULAR EMERGENCY MESSAGE SYSTEM

CROSS-REFERENCE TO RELATED APPLICATIONS

The present application is related to co-pending application Ser. No. 08/419,349, now U.S. Pat. No. 5,572,204, entitled "VEHICULAR EMERGENCY MESSAGE SYSTEM" and Ser. No. 08/420,900 entitled "VEHICULAR EMERGENCY MESSAGE SYSTEM WITH AUTOMATIC PERIODIC CALL-IN", filed concurrently herewith.

BACKGROUND OF THE INVENTION

The present invention relates in general to a communication system that provides an automated and simplified interface between a vehicle and an emergency response center, and more specifically to controlling the message system to maintain or reestablish a communication channel between a vehicle and a response center until the response center signals that the request of assistance has been properly handled to termination.

The use of transportation vehicles such as automobiles on roads and highways inevitably involves some number of breakdowns or collisions, or situations involving health difficulties of a driver or a passenger in which roadside vehicle service, such as a tow truck, or emergency assistance, such as police, ambulance, or fire, are needed. A means of summoning help is desirable in such situations and the availability of radio communications has been very beneficial in that regard. Cellular telephones are often installed or carried in vehicles by their owners for this reason.

The response time to a request for help should be minimized to meet any potential need for critical services. Accurate information must be provided to the emergency service provider to permit effective and timely response. However, many cellular phone callers to emergency services are unable to provide their location accurately in a timely manner. In addition to position information, a service provider benefits from having information on vehicle identification, cellular phone number of the telephone in the vehicle, the cellular system identification from which a call originated, and speed and heading of a vehicle.

Automatic position locating systems such as a global positioning system (GPS) receiver have been utilized in conjunction with a cellular telephone unit to provide position information over a cellular link (see U.S. Pat. No. 5,043,736, for example). However, prior systems have failed to adequately automate operation of a communication system to sufficiently reduce the burden on the vehicle operator to follow a rigid operating procedure or provide certain information to the service provider. Such complexity has limited the effectiveness of such systems, especially when the user is in a stressful emergency situation or unable to respond.

SUMMARY OF THE INVENTION

The present invention provides a positioning and communication system having the advantage that a user need activate only a single button to secure roadside or emergency assistance. The invention automatically secures and maintains contact with a response center until a request for assistance is resolved.

Specifically, the present invention provides a vehicular emergency message system in a mobile vehicle for communicating with a response center. A position locator receives reference broadcast signals and determines a position of the vehicle. A communications transceiver, such as a cellular telephone, has an audio input, an audio output, and a control input. A controller is coupled to the position locator and the communications transceiver for causing the communications transceiver to communicate with the response center in a predetermined manner. The controller operates in a wait mode, an activation mode, and a communication mode. The controller includes a tone detector for detecting a termination signal from the response center. The system also includes an activation unit coupled to the controller responsive to a manual activation to send an activating signal to the controller to place the controller from the wait mode into the activation mode.

The activation mode is comprised of obtaining control of the communications transceiver through the control input and establishing a communication channel between the communications transceiver and the response center. The controller enters the communication mode once the communication channel is established.

The communication mode is comprised of 1) transmitting audio signals responsive to a data (e.g., modem) output of the controller for specifying a unique identifier code of the vehicle and specifying the position determined by the position locator, 2) enabling voice contact between the vehicle and the response center using the audio output and the audio input, 3) monitoring the communication channel for a termination signal sent by the response center, 4) sensing an absence of the communication channel, and 5) reentering the activation mode upon sensing of the absence of the communication channel prior to receiving the termination signal.

BRIEF DESCRIPTION OF THE DRAWINGS

FIG. 1 is a block diagram showing vehicle hardware and infrastructure elements of a vehicle emergency message system.

FIG. 5 is a schematic block diagram showing the controller of FIG. 1 in greater detail.

FIG. 6 illustrates a data string utilized in the present invention.

FIG. 7 is a table showing construction of the account block of FIG. 6.

FIG. 8 is a table showing construction of the event block of FIG. 6.

DETAILED DESCRIPTION OF PREFERRED EMBODIMENTS

Figure 2:
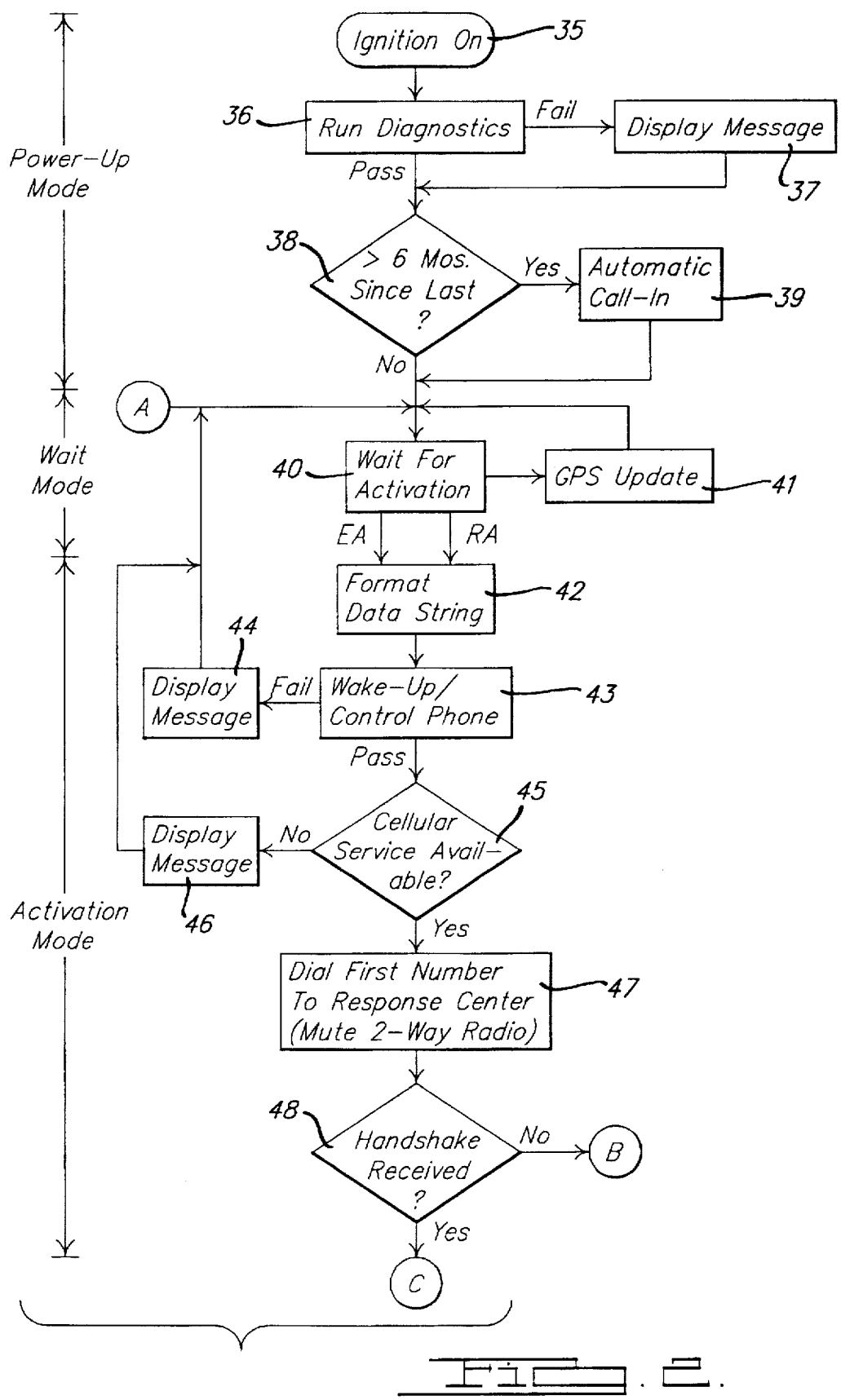
FIGS. 2–4 show a flowchart describing operation of a vehicle apparatus in the present invention.

Referring to FIG. 1, a vehicle emergency message system includes vehicle hardware 10 and system infrastructure 11. Infrastructure 11 includes GPS satellites 12 in earth orbit, a network of cellular towers 13 connected to a land-line phone system 14. A response center 15 is connected to telephone system 14 and provides a 24 hour monitoring service responsive to messages and requests for assistance from registered users.

Vehicle hardware 10 includes a system controller 20 connected to a GPS receiver 21 and a cellular transceiver 22. GPS receiver 21 is connected to a GPS antenna 23 typically in the form of a radome, while cellular transceiver 22 is connected to a cellular antenna 24. A cellular handset 25 is connected to cellular receiver 22 through system controller 20, thereby allowing system controller 20 to control cellular transceiver 22 and access the audio signal transmissions of transceiver 22.

System controller 20 interacts with a user (i.e., the driver or a passenger of the vehicle) through a switch assembly 26 and a display message center 27. Switch assembly 26 preferably includes two push buttons for activating the vehicle emergency message system according to the type of assistance that is needed, thereby allowing the response center to prioritize incoming requests. Preferably, the two push buttons identify either a request for roadside assistance (i.e., vehicle mechanical trouble) or emergency assistance (i.e., a medical condition or a crime in progress). Switch assembly 26 may preferably be mounted to an overhead console in a vehicle, for example. Display message center 27 is preferably mounted to an instrument panel of the vehicle and provides an alphanumeric display (e.g., an LED matrix or a vacuum fluorescent display) to show system status and to display system information as will be described below.

Transceiver 22 operates in either a handset or a hands-free mode. A hands-free microphone 28 is mounted in the vehicle and connected to transceiver 22. A hands-free speaker 29 can be connected directly to transceiver 22 or may be connected through the vehicle audio system 30 (i.e., the amplifier and speakers of the vehicle audio/radio system can be employed as the hands-free speaker for the cellular phone).

Operation of vehicle hardware 10 will be described with reference to the flowchart of FIGS. 2–4. In general, hardware operation is characterized herein by four operating modes; a power-up mode, a wait mode, an activation mode, and a communication mode. The power-up mode includes the performance of system diagnostics to determine if component failures exist. The wait mode includes the updating of vehicle position information while waiting for a manual activation by the user. The activation mode includes the assembly of data for transmission to the response center, dialing of the cellular phone to establish communication with the response center, and detection of a successful connection. In the communication mode, digital data may be sent to the response center and voice contact between the user and the response center is established.

Figure 3:
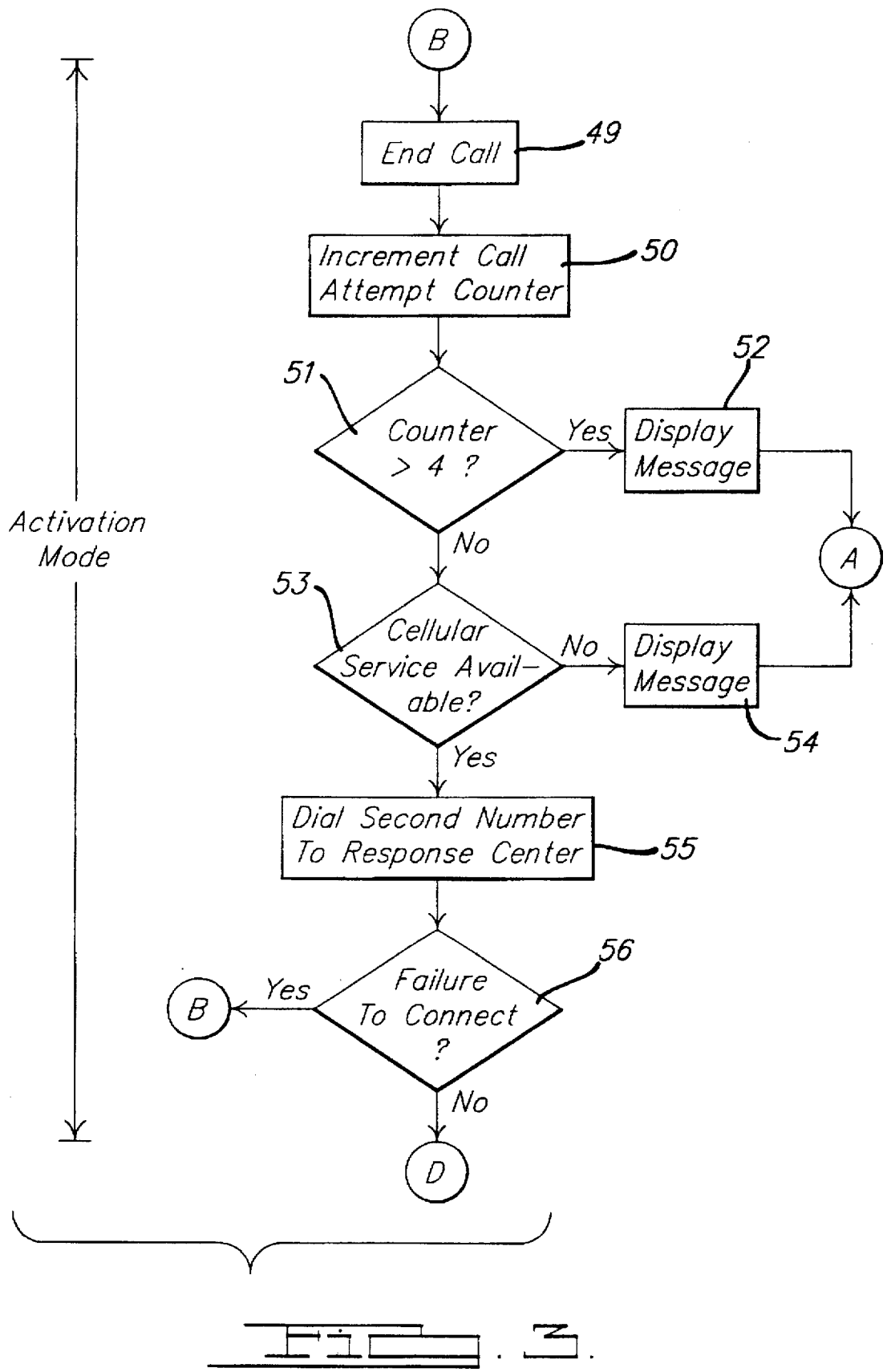

Referring to FIG. 2, the power-up mode begins when the vehicle ignition switch is turned on in step 35. A self-diagnostic check of the vehicle emergency message system (VEMS) components is run in step 36 and preferably includes GPS diagnostics, cellular phone diagnostics, and activation switch diagnostics. If any fault condition is detected that prevents proper operation of the system, then a message such as "SYSTEM FAILURE" is displayed in the message center in step 37. An indicator light may be provided, e.g., mounted on switch assembly 26, that is illuminated during power-up diagnostics at the beginning of step 36 and is extinguished in the event that all diagnostic tests are passed at the end of step 36. Step 37 bypasses the turning off of the indicator light so that it remains lit as a reminder that a fault has been detected.

Following the diagnostic tests, an automatic call-in procedure may be optionally utilized during the power-up mode. In step 38, a check is made whether a predetermined duration of time (e.g., preferably at least six months) have passed since the last time that VEMS 10 was connected to the response center. If at least six months have passed, then an automatic call-in is performed in step 39. The automatic call-in to the response center helps assure that the system is functioning properly and that a user's cellular account is active. If the response center has not received an automatic call-in from a particular vehicle within a predetermined time after the six month period, then the response center can send a reminder to the vehicle owner to have their system checked.

After the power-up mode, system 10 enters the wait mode and waits for a manual activation of the switch assembly in step 40. While in the wait mode, system 10 obtains periodic position updates from the GPS receiver in step 41. Position may be updated at one second intervals, for example. In addition to position, each update includes an updated time (i.e., time-of-day and date) and vehicle direction and speed (as determined by doppler effects on the received GPS satellite signals provided the vehicle is moving at at least about 15 MPH). The most recently obtained valid position in longitude and latitude, together with the time it was collected and the last obtained vehicle heading and speed information, are stored in a memory in system 10. Thus, system 10 is able to provide the response center with the most recently collected valid position of the vehicle and the direction it is or was most recently heading. The GPS receiver may be momentarily unable to determine position in the event that obstructions are preventing reception of GPS signals at the time the call for assistance is made. If system 10 is unable to collect GPS readings for greater than a predetermined period of time, it may be desirable to indicate a failure to the user via the message center or an indicator light, and to store an indication of the failure in memory as a diagnostic code.

In step 40, the controller polls the manual activation buttons in the switch assembly to detect a manual activation. The switch assembly preferably provides a roadside assistance (RA) button labeled with a tow-truck and an emergency assistance (EA) button labeled with an ambulance, for example. When the user presses either button, an RA signal or an EA signal is generated which places system 10 in the activation mode and causes a message, such as "ROADSIDE REQUEST" or "EMERGENCY REQUEST", to be displayed.

In step 42 of the activation mode, the controller formats a data string to be transmitted to the response center using a modem signal via the cellular transceiver. The data string includes customer identification, position, and other information as will be described below. In step 43, the controller wakes-up (i.e., activates, if necessary) and establishes control of the cellular transceiver. If the controller is not successful in obtaining control of the cellular phone, then a message is displayed, such as "SYSTEM FAILURE", and the attempt to make a call aborted with a return to point A. If the cellular phone is active and in use, step 43 may include terminating an existing call so that the response center can be contacted. In step 45, the VEMS controller verifies whether cellular service is available in the area where the vehicle is located (i.e. whether the cellular transceiver can establish communication with a cellular tower). If cellular service is not available after attempting to establish a connection for a certain time (e.g., up to two minutes), then a message such as "NO CELLULAR SIGNAL" is displayed in step 46 and a return is made to the wait mode via point A.

In the event that cellular service is available, the controller causes the cellular transceiver to dial a first number to the response center while the hands-free audio of the phone is muted in step 47. Two separate numbers to the response center are preferably utilized wherein the first number connects to an automated data receiver for receiving digitally transmitted information via modem prior to connecting the user with a human operator. A second number bypassing the automated data reception and connecting directly to the human operator is used in some circumstances as will be described below. In the first call, however, the automated transmission of data is attempted and the audio outputs of the phone are muted in the vehicle so that modem signals are not heard by the user. Preferably, the system controller maintains full, uninterruptible control over the cellular transceiver during this first call to ensure a reliable connection with the response center in the majority of instances.

Upon connection with the automated data receiver at the response center, a handshake signal is sent from the response center using a tone at a predetermined frequency. System 10 attempts to detect a handshake tone and if one is received in step 48 then a jump is made to the communications mode at point C (as will be described below with reference to FIG. 4). If a handshake signal is not received in step 48, then the activation mode continues at point B in FIG. 3.

After point B, a command to end any pending call is sent to the cellular transceiver in step 49. In response to the failure to receive a handshake signal, a call attempt counter is incremented in step 50 (this counter should equal 1 after a failure during the first call).

In step 51, the failure counter is checked to determine whether greater than a predetermined number of attempted calls have occurred, e.g., 4. If yes, then a message is displayed in step 52 such as "UNABLE TO PLACE CALL" and a return is made to the wait mode at point A. If less than the maximum number of attempted calls have occurred, then a recheck for availability of cellular service is performed in step 53. If cellular service is not obtained within two minutes, then a message is displayed in step 54 such as "NO CELLULAR SIGNAL" and a return is made to the wait mode at point A. Otherwise, the controller causes the cellular receiver to dial a second number to the response center in step 55. In the call to the second number, which is a voice number that bypasses the data receiver at the response center, the cellular phone is placed in hands-free mode and is unmuted to allow conversation between the user and the operator at the response center. Unlike during the first call, the user has full control over the cellular phone via the handset during the second call to provide maximum flexibility in unusual circumstances.

In an alternative embodiment, only one, attempted call is made to the second number. In that case, it is not necessary to maintain a call attempt counter. A return to the wait mode is made if the second call fails to reach the response center on its first try.

An important reason to conduct the second call to a second number and having the hands-free phone audio unmuted during the second call, is that if the user is outside his home cellular phone area (i.e., is "roaming") an operator for the cellular system to which the user connects may come on-line to request credit card or other information before completing a cellular call. By unmuting the phone, not automatically transmitting the data during a second call, and relinquishing control of the cellular phone to the user, the user can interact with the cellular operator to obtain a phone connection to the response center. The response center can still then obtain the digital data using a retransmit tone as described below.

If the cellular phone detects a failure to establish a cellular connection after dialing the second number, then the failure is detected by the controller in step 56 and a return is made via point B to step 50 for a possible redial to the second number. If dialing the second number is successful as detected in step 56, then the system is placed in the communication mode via point D.

Figure 4:
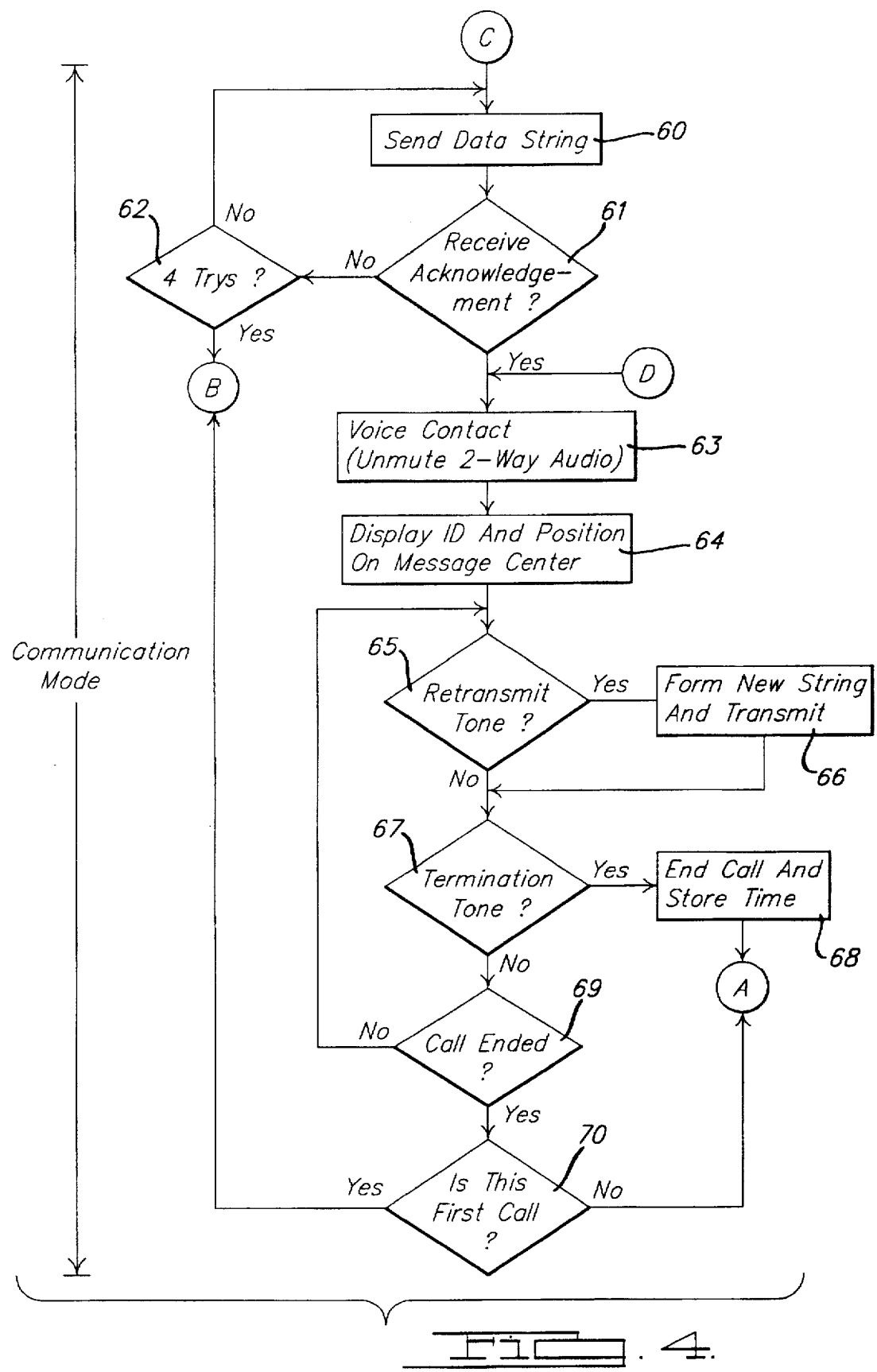

Operation of system 10 in the communication mode is shown in FIG. 4. After successful connection to the first phone number at point C, the data string that was previously formatted is sent to the response center via modem in step 60. Upon successful reception of the data at the response center, the response center produces an acknowledgement tone at a predetermined frequency. System 10 checks for receipt of the acknowledgement tone in step 61. If no acknowledgement tone is received, then a check is performed in step 62 to determine whether to try to resend the data string. For example, a maximum of four attempts to send the data string may be performed. If less than the maximum number of tries have been attempted, then a return is made to step 60, otherwise a return is made to the activation mode at point B for attempting to connect to the second phone number without data transmission. If an acknowledgement tone is received to the data string, then the cellular phone is unmuted in step 63 to provide two-way audio and voice contact is made with the response center after the call is transferred to a live operator. In addition, at least some of the information from the data string is displayed on the message center in step 64. During the first call, this information may be used to confirm the data already sent to the response center.

If the communication mode is entered at point D following a call to the second (non-data) phone number, then the information from the data string displayed on the message center in step 64 preferably includes an identification of the user (e.g., a customer ID) and the last obtained position from the GPS receiver displayed in latitude and longitude. As this information is displayed in step 64, the response center can obtain the displayed information by having the user read it over the cellular communication channel.

During voice contact with the response center, the system controller in the vehicle monitors the communication channel for tone signals transmitted by the response center. In step 65, the communication channel is monitored for a retransmit tone indicating a request by the response center for the vehicle to resend the data string. A new, updated data string is formed and then transmitted in step 66. Thus, the response center may obtain the data in the data string even though the first data call may have been unsuccessful. Also, the response center can obtain updates to the information as a call is in progress, such as where the vehicle continues to move during the emergency.

The controller likewise monitors the communication channel for a termination tone in step 67. The response center will send a termination tone when a successful resolution has been reached in the call for assistance (e.g., a service provider has been dispatched to the scene). Upon detection of the termination tone, the controller sends an end-call command to the cellular phone and stores the current time in memory to replace the time of last successful connection with the response center in step 68. Then a return to the wait mode is made at point A.

In step 69, if the cellular transceiver detects that a call has ended, either intentionally or because of loss of the cellular carrier signal, it sends a signal to the controller indicating an end of call, otherwise the communication channel continues to be monitored for retransmit or other tones.

In response to premature ending of the call in step 69, the controller may preferably return to point B in the activation mode for a possible attempt to reconnect the user with the response center. In an alternative embodiment as shown in FIG. 4, an attempt to automatically reconnect is made only if it was the first call that ended prematurely. Thus, step 70 checks whether the call was the first call. If it was the first call, then a return is made to point B for a second call. If it was not the first call, then a return is made to the wait mode at point A.

FIG. 5 shows system controller 20 in greater detail. A control block 75 such as a microprocessor is connected to a modem 76 and a memory 77. Control block 75 is connected to GPS receiver 21, handset 25, and switch assembly 26. Control block 75 is further connected to cellular transceiver 22 via a control bus 80. Control signals that are exchanged between control block 75 and cellular transceiver 22 via bus 80 include a mute control signal, a phone in-use signal, and control signals to place the cellular transceiver into a desired configuration and to command certain actions such as dialing of supplied phone numbers. Furthermore, control signals from handset 25 may be passed through control block 75 to transceiver 22 during normal phone operation.

A handset audio input of transceiver 22 is connected to an output of modem 76 and to an output of handset 25 allowing a modem audio output to be input to the cellular transceiver. The handset microphone may be inactivated during modem output using the control line between control block 75 and handset 25. The handset audio output of transceiver 22 is connected to an input of modem 76 and to an input of handset 25. Modem 76 includes tone detector circuits comprising narrow bandpass filters and level detectors responsive to the predetermined tones that may be transmitted by the response center. For example, a termination tone of 2,025 Hz and a retransmit tone of 2,225 Hz and each having a duration of about 1 to 1.4 seconds are employed in a preferred embodiment. Of course, any frequency within the audio range of the cellular transceiver can be employed. Upon detection of a particular tone, a signal is provided to control block 75 such as a retransmit signal, an acknowledgement (ACK) signal, a negative acknowledgement (NACK) signal, or a termination signal.

Memory 77 stores data such as the first and second phone numbers to the response center, the last GPS position longitude and latitude, time-of-day and date of GPS position, time-of-day and date of last connection with the response center, a customer identification code, any diagnostic codes detected during system diagnostics, and other information. Control block 75 utilizes data from memory 77 in formatting a data string for transmission. In addition, information such as the cellular telephone number of the cellular phone and any identification of the cellular carrier to which the cellular phone is currently connected are obtained from transceiver 22 for inclusion in the data string.

Switch assembly 26 includes a roadside assistance pushbutton 81 and an emergency assistance pushbutton 82 for providing signals RA and EA, respectively, to control block 75.

Message center 27 is connected to control block 75 over a bus 83. Message center 27 is shown as a matrix display capable of displaying alphanumeric characters in a 3×8 matrix.

Data communications between controller 20 and the response center will be described in greater detail with reference to FIGS. 6–8. Data communications are preferably in conformance with Section 3 of the *Digital Communications Standard* by SIA, February, 1993.

FIG. 6 illustrates the contents of the data string assembled for transmission. The data string includes an account block 85, an event block 86, one or more ASCII blocks 87 and 88, and a zero block 89. Each block is transmitted separately by the modem.

Account block 85 is the first block to be sent and is used to pass the customer identification number (CID) stored in memory that may be assigned based on the identity of the vehicle. Thus, the response center automatically retrieves information on the identity of the vehicle and the owner involved in the request. The account number may preferably have an assigned unique identifier code based on the vehicle identification (VIN) number given to a vehicle at the time of manufacture. Some subset of the full VIN number may be used if the CID has less characters than the VIN.

Event block 86 is the second block to be sent and is used to pass information concerning the type of request (i.e., either roadside assistance or emergency assistance) and time-of-day and date information.

ASCII blocks 87 and 88 are transmitted after event block 86 and include additional information such as latitude and longitude position, vehicle heading, vehicle speed, dilution of precision (DOP), cellular phone number, cellular system identification, and any diagnostic codes logged into the memory.

The last block to be transmitted is the zero block which marks the end of the data and which requests acknowledgement from the response center to receipt of the data.

Each block is constructed with a header byte, a function byte, data bytes, and a column parity byte. FIG. 7 shows an example of the construction of an account block. The header byte includes a reverse channel enable (RCE) bit, and acknowledge request (AR) bit, and block length (BLen) bits. As defined in the SIA document referred to above, the RCE bit serves to identify the beginning of a block. The AR bit tells the receiver at the response center whether to acknowledge receipt of a particular block. In a preferred embodiment of the present invention, only the account block and the zero block request acknowledgement. The value of the BLen bits specifies the number of data bytes being transmitted in the block. A shown in FIG. 7, the binary value of RCE is always zero. The binary value of AR is one since the account block requests acknowledgement. The binary value of BLen of "1010" corresponds to the length of the CID data field equal to 10 in decimal. The hexadecimal and ASCII values of the block are also shown in FIG. 7, with the exception of column parity (CPar) values which are not shown but are within the skill of the art to derive. A function code of "#" in ASCII is shown identifying that the block is the account block.

FIG. 8 shows an example of a construction of an event block. The function code for the event block identifies the position information in a request as new ("N") GPS data or old ("O") GPS data. The data in the event block specifies the date and time-of-day of the last valid GPS position and also identifies the type of event causing the data to be transmitted. Thus, an event code is specified for an emergency assistance request, a roadside assistance request, a follow-up or retransmission of data in response to a retransmit tone, and an automatic (6 month) call-in. In a preferred embodiment, an event code "QA" identifies emergency assistance, "QS" identifies roadside assistance, "YY" identifies a follow-up transmission, and "RP" identifies an automatic call-in.

As shown in FIG. 8, data fields in the blocks may include alphanumeric characters to identify data within a block, such as "da" prior to the date and "ti" prior to the time-of-day in the data field of FIG. 8. These identifiers are provided in the event that the operator at the response center needs to view the transmitted data directly because of an equipment failure at the response center.

The ASCII blocks contain the remaining information to be transmitted as described above (eg., latitude, longitude, heading, speed, DOP, cellular phone number, and cellular system ID). In addition, the ASCII blocks may transmit information on the revision or version of the vehicle hardware and software installed in the vehicle or diagnostic failure codes.

Although global position system (GPS) and cellular technologies have been described in the preferred embodiment, other positioning and communication technologies could be used in the present invention. For example, position information could be obtained from the Loran-C system or other navigation systems. A communication system such as the personal communication service (PCS) could also be used. In addition to activating the vehicle emergency message system from any manual switch assembly, service requests could also be initiated automatically, such as in response to deployment of an airbag.

What is claimed is:

1. A vehicular emergency message system in a mobile vehicle for communicating with a response center, comprising:

a position locator receiving reference broadcast signals and determining a position of said vehicle;

a communications transceiver having an audio input, an audio output, and a control input;

a controller coupled to said position locator and said communications transceiver for causing said communications transceiver to communicate with said response center in a predetermined manner, wherein said controller operates in a wait mode, an activation mode, and a communication mode, said controller including a tone detector for detecting a termination signal from said response center; and an activation unit coupled to said controller responsive to a manual activation to send an activating signal to said controller to place said controller from said wait mode into said activation mode;

wherein said activation mode is comprised of obtaining control of said communications transceiver through said control input and establishing a call comprising a communication channel between said communications transceiver and said response center, said controller entering said communication mode once said communication channel is established; and wherein said communication mode is comprised of 1) transmitting audio signals responsive to a data output of said controller for specifying a unique identifier code of said vehicle and specifying said position determined by said position locator, 2) enabling voice contact between said vehicle and said response center using said audio input and said audio output, 3) monitoring said communication channel for a termination signal sent by said response center upon a successful resolution of said call, 4) sensing a loss of said communication channel, and 5) reentering said activation mode to reestablish voice contact with said response center upon sensing of said loss of said communication channel without having received said termination signal.

2. The system of claim 1 wherein said transmission of communication signals during said communication mode after reentering said activation mode is comprised of direct voice contact and does not include any automatic transmission of audio signals from said data output.

3. The system of claim 1 further comprising a counter for counting a number of reentries into said activation mode as a result of termination without said termination tone.

4. The system of claim 3 wherein said controller reenters said wait mode instead of said activation mode if a further reentry into said activation mode would cause said number of reentries to exceed a predetermined number.

* * * * *